(12) United States Patent
Zhang et al.

(10) Patent No.: US 12,169,467 B2
(45) Date of Patent: Dec. 17, 2024

(54) DATA DISTRIBUTION DEVICE, DATA DISTRIBUTION METHOD AND RELATED COMPUTING SYSTEM

(71) Applicant: BEIJING TUSEN ZHITU TECHNOLOGY CO., LTD., Beijing (CN)

(72) Inventors: Yu Zhang, Beijing (CN); Jianan Hao, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/145,013

(22) Filed: Dec. 21, 2022

(65) Prior Publication Data

US 2023/0205721 A1 Jun. 29, 2023

Related U.S. Application Data

(60) Provisional application No. 63/293,423, filed on Dec. 23, 2021.

(51) Int. Cl.
*G06F 13/42* (2006.01)
(52) U.S. Cl.
CPC .. *G06F 13/4221* (2013.01); *G06F 2213/0026* (2013.01)
(58) Field of Classification Search
CPC .............. G06F 13/4221; G06F 2213/0026
See application file for complete search history.

(56) References Cited

U.S. PATENT DOCUMENTS

| 11,349,753 B2 * | 5/2022 | Schooler | ............... H04L 67/566 |
| 11,741,760 B1 * | 8/2023 | Dubin | .................. G06F 3/0482 |
| | | | 340/990 |

(Continued)

FOREIGN PATENT DOCUMENTS

| CN | 109639547 A1 | 4/2019 |
| EP | 2852094 A1 | 3/2015 |

(Continued)

OTHER PUBLICATIONS

European Patent Office, Extended European Search Report for EP Appl. No. 22209547.3, mailed May 11, 2023, 8 pages.

(Continued)

*Primary Examiner* — Nimesh G Patel
(74) *Attorney, Agent, or Firm* — Perkins Coie LLP (57) ABSTRACT

The present disclosure provides a data distribution device, a computing system and a data distribution method. The data distribution device comprises: a plurality of interfaces at least comprising a first interface, a second interface and a third interface, wherein the first interface is configured for receiving first data comprising sensor data, the second interface is configured for outputting the first data, and the third interface is configured for communicating with a first computing unit; and a data transmission unit configured for providing the sensor data from the first interface to the second interface and providing a subset of the sensor data meeting a predetermined condition to the third interface. According to the above technical solution, efficiency and flexibility of data processing can be improved by utilizing the plurality of interfaces and the data transmission unit of the data distribution device.

20 Claims, 6 Drawing Sheets

(56) References Cited

U.S. PATENT DOCUMENTS

| | | | |
|---|---|---|---|
| 2019/0228236 A1 | 7/2019 | Schlight et al. | |
| 2019/0250611 A1* | 8/2019 | Costin | G05D 1/0257 |
| 2020/0167300 A1* | 5/2020 | Kunz | G06F 13/4022 |
| 2020/0374486 A1* | 11/2020 | Ceekala | H04N 7/106 |
| 2021/0001880 A1* | 1/2021 | Hu | G06N 3/063 |
| 2022/0261371 A1* | 8/2022 | Zhang | H04W 4/38 |
| 2023/0286530 A1* | 9/2023 | Angerer | G01C 21/3807 |

FOREIGN PATENT DOCUMENTS

| | | |
|---|---|---|
| JP | 2017212728 A1 | 11/2017 |
| JP | 2019134301 A | 8/2019 |
| WO | 2020122106 A1 | 6/2020 |
| WO | 2021106446 A1 | 3/2021 |
| WO | 2021084929 A1 | 5/2021 |
| WO | 2021065281 A1 | 8/2021 |

OTHER PUBLICATIONS

Japanese Patent Office, First Office Action for JP Appl. No. 2022-198917, mailed Jan. 16, 2024, 18 pages with English translation.
Japanese Patent Office, Decision of Refusal for JP Appl. No. 2022-198917, mailed Apr. 17, 2020, 10 pages with English translation.

* cited by examiner

DATA DISTRIBUTION DEVICE, DATA DISTRIBUTION METHOD AND RELATED COMPUTING SYSTEM

CROSS-REFERENCE TO RELATED APPLICATION(S)

This application claims priority to and the benefit of U.S. Provisional Application No. 63/293,423, entitled, "DATA DISTRIBUTION DEVICE, DATA DISTRIBUTION METHOD AND RELATED COMPUTING SYSTEM," filed Dec. 23, 2021. The entire content of the before-mentioned patent application is incorporated by reference as part of the disclosure of this application.

TECHNICAL FIELD

The present document relates to methods and systems for processing data, for example, distributing data.

BACKGROUND

In recent years, a variety of ever-changing sensors have been applied in various fields. For example, with the rapid development of the autonomous driving technology, the variety of sensors has been used, the bandwidth of sensor data has reached up to terabytes per second, and particularly, the number of sensors used in autonomous driving technologies is continuously increasing with the system complexity. Given the wide variety and the growing number of sensors, it is a challenge to properly configure a vehicle-mounted computing platform.

SUMMARY

The present disclosure provides a data distribution device, a computing system, a data distribution method and a storage medium, so as to realize transmission and distribution of sensor data and to improve efficiency and flexibility of data processing.

In one aspect of the present disclosure, a data distribution device is provided to include: a plurality of interfaces including at least a first interface, a second interface and a third interface, wherein the first interface is configured for receiving first data including sensor data, the second interface is configured for outputting the first data, and the third interface is configured for communicating with a first computing unit; and a data transmission unit configured for providing the sensor data from the first interface to the second interface and providing a subset of the sensor data meeting a predetermined condition to the third interface.

In another aspect of the present disclosure, a computing system is provided to comprise: a plurality of computing units including at least a first computing unit and a second computing unit; and at least one data distribution device configured for: receiving first data from a sensor system, the first data including sensor data, providing a first subset of the sensor data meeting a first predetermined condition to the first computing unit, and providing a second subset of the sensor data meeting a second predetermined condition to the second computing unit.

In yet another aspect of the present disclosure, a data distribution method is provided to include: receiving first data from a sensor system, the first data including sensor data, sending the sensor data from a data distribution device to another data distribution device, and providing a subset of the sensor data meeting a predetermined condition to a computing unit.

In still another aspect, the present disclosure provides a computer readable storage medium having program instructions stored thereon, wherein the program instructions, when executed by a processor, implements the data distribution method disclosed herein.

The embodiments of the present disclosure provide a data distribution device, a computing system, a data distribution method and a storage medium. Sensor data can be selectively provided to computing units by means of a plurality of interfaces of the data distribution device, and data distribution devices can be cascaded as desired. Thus, the number of the distribution devices can be set as desired, so that the number of the computing units is set, thereby realizing scalability of a computing system including the data distribution device. Besides, different computing units can be configured for processing different sensor data, so that efficiency and flexibility of sensor data processing are improved.

BRIEF DESCRIPTION OF THE DRAWINGS

The above-mentioned and other features, advantages and aspects of the embodiments of the present disclosure will become more apparent with reference to the following specific embodiments and in conjunction with the drawings. Throughout the drawings, the same or similar reference numbers refer to the same or similar elements. It should be understood that the drawings are for illustrative purposes, and that components and elements are not necessarily drawn to scale.

DETAILED DESCRIPTION

The present disclosure will be further described in detail with reference to the drawings and embodiments. It will be appreciated that the specific embodiments described herein are merely illustrative of the present disclosure and are not to be construed as limiting the present disclosure. In addition, the embodiments and features thereof in the present disclosure may be combined with one another without conflict. It should be further noted that, for the convenience of description, only some, but not all, structures associated with the present disclosure are shown in the drawings.

It should be noted that the terms "first", "second", and the like in the embodiments of the present disclosure are only used for distinguishing between different devices, modules, units, or other objects, and are not used for limiting the order of the functions performed by these devices, modules, units, or other objects, or the interdependence of these devices, modules, units, or other objects.

Figure 1:
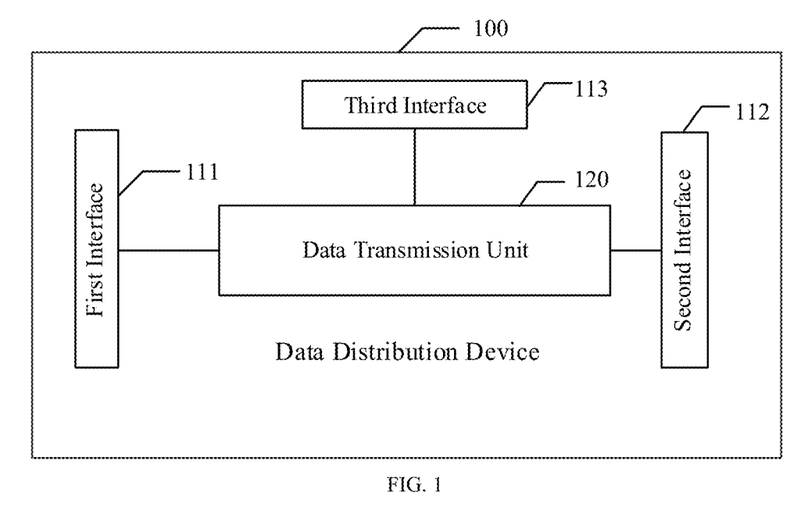
FIG. 1 is a schematic diagram of a data distribution device according to an embodiment of the present disclosure.

In the embodiment of the present disclosure, a data distribution device is provided. FIG. 1 is a schematic diagram of a data distribution device according to an embodiment of the present disclosure. As shown in FIG. 1, the data distribution device 100 comprises a plurality of interfaces and a data transmission unit 120. The plurality of interfaces comprise at least a first interface 111, a second interface 112 and a third interface 113. The first interface 111 is configured for receiving first data, the second interface 112 is configured for outputting the first data, and the third interface 113 is configured for communicating with a computing unit. The first data, for example, may be sensor data. The data transmission unit 120 is configured for providing the sensor data from the first interface 111 to the second interface 112 and providing a subset of the sensor data meeting a predetermined condition to the third interface 113.

The data distribution device 100 can receive sensor data from a sensor system through the first interface 111. The sensor system may comprise one or more sensors of the same type or different types.

The first interface 111 may be or include a SERializer/DESerializer (SerDes), or an Ethernet interface (i.e. an interface meeting the Ethernet standard), or may be collectively constituted by both a SerDes and an Ethernet interface.

The second interface 112 can be configured for transmitting sensor data to other devices, for example, another data distribution device. In the case that the second interface 112 is configured for transmitting sensor data to another data distribution device, the data distribution device 100 can be understood as a cascade device or a cascade unit (CU). The second interface 112 may be or include a SerDes, or an Ethernet interface, or may be collectively constituted by both a SerDes and an Ethernet interface.

The data transmission unit 120 transmits sensor data meeting a predetermined condition to the computing unit through the third interface 113, which can be understood as a process of distributing the sensor data to the computing unit. The computing unit comprises devices capable of processing data such as a computer, a server, an electronic control unit (ECU) and a system-on-a-chip, for example, a computer sold by the NVIDIA Corporation under the trademark of Xavier™ or Orin™. The computing unit may comprise one or more processor such as a microprocessor, an application specific integrated circuit (ASIC), a field programmable gate array (FPGA), a graphics processing unit (GPU), a central processing unit (CPU), and a processing kernel, for example, a processor sold by the Intel Corporation under the trademark of Intel® Xeon®. The third interface 113 may be or include an Ethernet interface, or a peripheral component interconnection express (PCIE) interface (i.e. an interface meeting PCIE standard), or may be collectively constituted by both an Ethernet interface and a PCIE interface. In addition, the Ethernet interface (or the PCIE interface) may comprise interfaces of different bandwidths.

When the third interface 113 is the PCIE interface, the data distribution device 100 can be formed as an endpoint (EP) in the PCIE standard, and the computing unit connected with the third interface 113 can serve as a root in the PCIE standard.

The predetermined condition is mainly used to describe a matching relationship between the sensor data and the computing unit. The matching relationship between the sensor data and the computing unit can be determined according to the source of sensor data, the type of sensors collecting sensor data, the type of sensor data, the data amount of sensor data, the data format of sensor data, the computing resource of computing units and/or the computing power of computing units, and the like. For example, if the predetermined condition is concerning computing resource or computing power of the computing unit, the data transmission unit 120 can select sensor data from one or several sensors of the sensor system and provide the selected sensor data to the computing unit according to the computing resource or computing power of the computing unit.

In an embodiment, each sensor of the sensor system has a unique sensor identifier. The sensor data comprise a plurality of data packets, each data packet carrying a sensor identifier (i.e., the sensor identifier of the sensor generating the data packet). The data transmission unit 120 can determine whether the sensor identifier carried by each data packet matches a predetermined identifier or not (e.g., determine whether the sensor identifier carried by the data packet is the same as the predetermined identifier), and when the sensor identifier matches (e.g., is the same as) the predetermined identifier, the data transmission unit 120 provides the data packet to the computing unit through the third interface 113. This allows sensor data from selected one or several sensors of the sensor system to be provided to the computing unit (instead of providing sensor data of all sensors of the sensor system to the computing unit).

In an embodiment, when the computing unit is configured for processing sensor data of sensors of a selected type, then the data transmission unit 120 can provide the sensor data of the sensors of the selected type to the computing unit through the third interface 113.

The data transmission unit 120 can provide a data channel (e.g., a data pool or a data pipeline) for the transmission of sensor data between the first interface 111 and the second interface 112. All sensor data received by the first interface 111 from the sensor system is transmitted to the second interface 112 through this data channel and then transmitted to another device (e.g., another data distribution device) connected with the data distribution device 100 through the second interface 112. For example, if the first interface 111 receives sensor data of n sensors (n is an integer greater than 1), the sensor data of the n sensors are transmitted to another data distribution device connected with the data distribution device 100 through the second interface 112, and the sensor data of m sensors (m is an integer greater than 1 and less than n) of the n sensors can be provided to the computing unit through the third interface 113.

In an embodiment, the data distribution device 100 may further comprise a preprocessing unit, wherein the data transmission unit 120 can send the sensor data to the preprocessing unit before transmitting the sensor data to the third interface 113, and then the preprocessing unit transmits the sensor data to the third interface 113 after preprocessing. The preprocessing performed by the preprocessing unit includes, for example, noise removal, format conversion, and coordinate transformation.

In an embodiment, the entire data distribution device 100 is implemented by a programmable hardware element, such as a field programmable gate array (FPGA) or an application specific integrated circuit (ASIC) or a combination thereof. In an embodiment, a part of the data distribution device 100 (such as the data transmission unit 120) is implemented by a programmable hardware element, such as a field programmable gate array (FPGA) or an application specific integrated circuit (ASIC) or a combination thereof. The FPGA has the features of abundant wiring resources, repeatable programming, high integration level and the like. What's more, the FPGA, when configured for distributing sensor data, can integrate enormous interfaces. Logic programs or instructions can be written into the FPGA according to actual requirements of the data distribution process to implement various units of the data distribution device 100 (such as the data transmission unit 120, the first interface 111, the second interface 112, and the third interface 113). Therefore, FPGA has strong scalability, and can improve the reliability of data distribution. The data distribution device in this embodiment can selectively provide the sensor data to the computing unit through a plurality of interfaces and a data transmission unit, and the data distribution devices can be cascaded as desired. Thus, the number of the data distribution devices can be set as desired, so that the number of the computing units is set, and different computing units can be configured for processing different sensor data, so that efficiency and flexibility of sensor data processing are improved. When both the first interface 111 and the second interface 112 are SerDes, high-speed data transmission can be realized.

Figure 2:
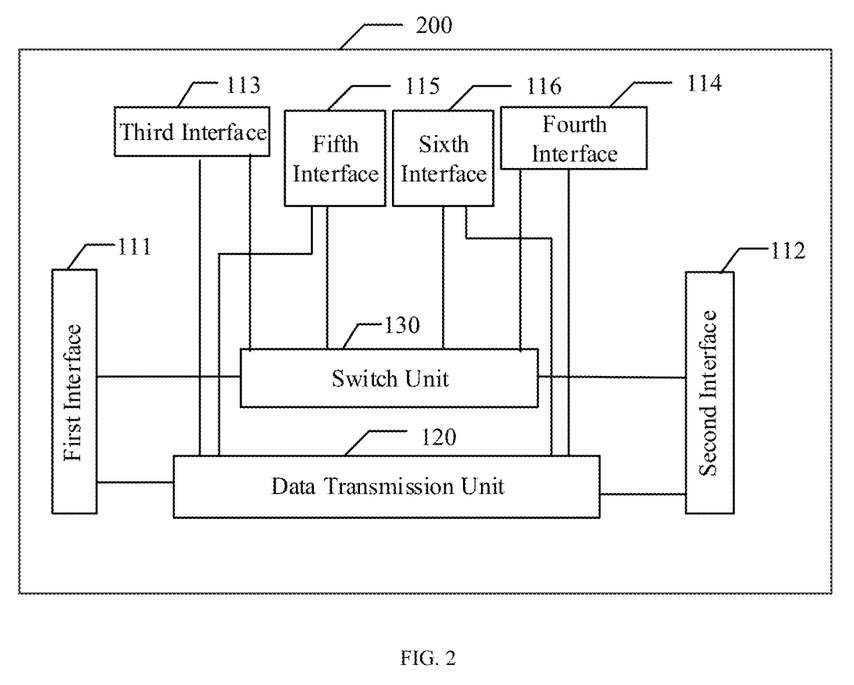
FIG. 2 is a schematic diagram of a data distribution device according to another embodiment of the present disclosure.

FIG. 2 is a schematic diagram of a data distribution device according to another embodiment of the present disclosure. The data distribution device 200 of FIG. 2 differs from the data distribution device 100 of FIG. 1 in that the data distribution device 200 further comprises a switch unit 130 and a plurality of other interfaces (e.g., a fourth interface 114, a fifth interface 115, and a sixth interface 116). In order to avoid unnecessary repetition, the following description will not describe in detail the same parts of the data distribution device 200 as the data distribution device 100, and will focus on differences between the data distribution device 200 and the data distribution device 100.

As shown in FIG. 2, the data distribution device 200 comprises, in addition to the first interface 111, the second interface 112, the third interface 113, and the data transmission unit 120 (see the description above according to FIG. 1): a switch unit 130 configured for switching second data between different interfaces. As described above, the first data may be data received from the sensor system (e.g., sensor data), and the second data may be data from the computing unit (e.g., various data generated by the computing unit processing the sensor data, or various instructions generated by the computing unit).

In an embodiment, the third interface 113 can be configured for communicating with a first computing unit, and the fourth interface 114 can be configured for communicating with a second computing unit, so as to transmit sensor data meeting (the same or different) predetermined conditions to the first computing unit and the second computing unit, respectively, which can also be understood as a process of distributing the sensor data. The first and second computing units may each comprise devices capable of processing data such as a computer, a server, an electronic control unit and a system-on-a-chip. Each computing unit may comprise one or more processing units, such as a microprocessor, an ASIC, an FPGA, a GPU, a CPU, or a processing kernel. The second computing unit may be the same as or different from the first computing unit. The second computing unit and the first computing unit can separately process different sensor data (e.g., sensor data from different sensors, or sensor data from sensors of different types), thereby reducing the load of each computing unit and improving data processing efficiency. For example, both the second computing unit and the first computing unit can process light detection and ranging system (LIDAR) data (i.e., LIDAR point cloud data), with the first computing unit processing LIDAR data from one or more LIDARs and the second computing unit processing LIDAR data from one or more other LIDARs. Alternatively, the first computing unit processes image data from one or more image acquisition devices (e.g., a camera) and the second computing unit processes LIDAR data from one or more LIDARs.

In an embodiment, the first computing unit receives sensor data from the data transmission unit and performs a first processing on the sensor data, and the second computing unit receives the data processed by the first computing unit (e.g., via the switch unit 130) instead of receiving sensor data from the data transmission unit, and performs a second processing different from the first processing on the data processed by the first computing unit.

The third interface 113 and the fourth interface 114 may be Ethernet interfaces or PCIE interfaces. The third interface 113 and the fourth interface 114 can perform high-speed serial point-to-point dual-channel high-bandwidth low-delay transmission with the first computing unit and the second computing unit respectively based on the PCIE standard, thereby improving the distribution and processing efficiencies of sensor data. When the third interface 113 and the fourth interface 114 are the PCIE interfaces, the data distribution device 100 is formed as an endpoint (EP) in the PCIE standard. In this case, the computing units (i.e., the first computing unit and the second computing unit) connected with the data distribution device 100 can serve as roots in the PCIE standard, so that a peer-to-peer relationship between the first computing unit and the second computing unit is realized, and the sensor data are flexibly distributed to each computing unit as desired.

When the third interface 113 and the fourth interface 114 are the PCIE interfaces, the data distribution device 100 further comprises: a fifth interface 115 and a sixth interface 116 which are Ethernet interfaces. The fifth interface 115 and the sixth interface 116 have substantially the same functions as the third interface 113 and the fourth interface 114, except that these interfaces meet different protocols, and therefore a computing unit without a PCIE interface can be connected through the fifth interface 115 and the sixth interface 116. At this point, the switch unit 130 can simultaneously implement the functions of both a PCIE switch and an Ethernet switch.

As shown in FIG. 2, the switch unit 130 can switch the second data between different interfaces by utilizing switch logic. For example, the second data can be switched between the first interface 111 and other interfaces, such as the third interface 113, the fourth interface 114, the fifth interface 115, and/or the sixth interface 116. The second data can also be switched between the second interface 112 and other interfaces, such as the third interface 113, the fourth interface 114, the fifth interface 115, and/or the sixth interface 116. The second data can further be switched between the third interface 113 and the fourth interface 114 (or the sixth interface 116), or between the fifth interface 115 and the fourth interface 114 (or the sixth interface 116). The switching process of the second data in this embodiment can be implemented by utilizing switch logic in the data distribution device without depending on other hardware elements. On this basis, the data distribution device 100 can realize not only the transmission and distribution of the first data (e.g., sensor data) but also the switching of the second data.

In an embodiment, the data distribution device 100 can communicate with the first computing unit through both the third interface 113 and the fifth interface 115, and with the second computing unit through both the fourth interface 114 and the sixth interface 116. As described above, the third interface 113 and the fifth interface 115 can be interfaces of different types, and the fourth interface 114 and the sixth interface 116 can be interfaces of different types. For example, the third interface 113 and the fourth interface 114 are PCIE interfaces, and the fifth interface 115 and the sixth interface 116 are Ethernet interfaces; the data distribution device 100 can select the third interface 113 or the fifth interface 115 to communicate with the first computing unit and select the fourth interface 114 or the sixth interface 116 to communicate with the second computing unit, depending on the bandwidths required for the first data to be provided for the computing units and the second data to be switched. For example, if the bandwidths required for the first data to be provided for the computing units and the second data to be switched are greater than a bandwidth threshold, the data distribution device 100 communicates with the computing units through the PCIE interfaces, and otherwise communicates with the computing units through the Ethernet interfaces.

As described above, the sensor data comprise a plurality of data packets, each of which matches a computing unit corresponding thereto, and data packet meeting a predetermined condition can be provided to the computing unit corresponding thereto through the interface corresponding thereto. The data transmission unit 120 can determine whether the sensor identifier carried by each data packet matches a predetermined identifier or not (e.g., determine whether the sensor identifier carried by the data packet is the same as the predetermined identifier). The data transmission unit 120 provides the data packet to the first computing unit through the third interface 113 and/or the fifth interface 115 when the sensor identifier matches (e.g., is the same as) a first predetermined identifier, and the data transmission unit 120 provides the data packet to the second computing unit through the fourth interface 114 and/or the sixth interface 116 when the sensor identifier matches (e.g., is the same as) a second predetermined identifier.

In an embodiment, the data transmission unit 120 is further configured for: receiving an instruction from the respective computing unit through interfaces (e.g., one or more of the third interface to the sixth interface), the received instructions carrying a predetermined identifier. For example, the data transmission unit 120 receives the first predetermined identifier from the first computing unit and the second predetermined identifier from the second computing unit.

In an embodiment, the data distribution device 100 can be connected with the first computing unit and the second computing unit through the third interface 113 and the fourth interface 114, respectively, and with a third computing unit and a fourth computing unit through the fifth interface 115 and the sixth interface 116, respectively. The third computing unit and the fourth computing unit can be other computing units different from the first computing unit and the second computing unit.

Figure 3:
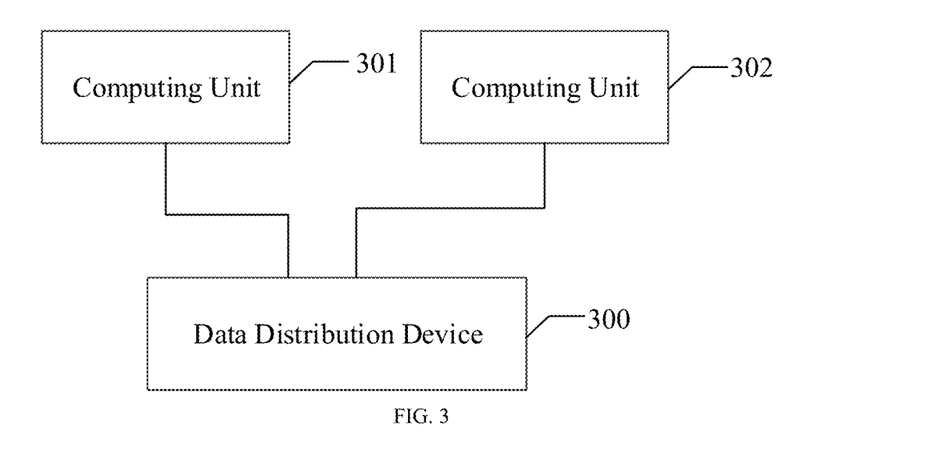
FIG. 3 is a schematic diagram of a computing system according to an embodiment of the present disclosure.

The embodiment of the present disclosure further provides a computing system. FIG. 3 is a schematic diagram of a computing system according to an embodiment of the present disclosure. As shown in FIG. 3, the computing system comprises: a plurality of computing units such as a computing unit 301 and a computing unit 302; and at least one data distribution device 300, which may be, for example, the data distribution device 200 of FIG. 2. The data distribution device 300 is configured for: receiving first data from a sensor system, the first data comprising sensor data, providing a first subset of the sensor data meeting a first predetermined condition to one computing unit, e.g., the computing unit 301, and providing a second subset of the sensor data meeting a second predetermined condition to another computing unit, e.g., the computing unit 302.

The plurality of computing units can correspond to different predetermined conditions, e.g., the computing unit 301 corresponds to the first predetermined condition and the computing unit 302 corresponds to the second predetermined condition, so that different sensor data are provided for different computing units. Sensor data received by each computing unit may be from sensors of the same type or different types, and different sensors can be distinguished by identifiers. In other embodiments, the computing unit 301 and the computing unit 302 can correspond to the same predetermined condition so as to receive same sensor data, and at this point, the computing unit 301 and the computing unit 302 can perform different processing on the sensor data.

For example, the computing unit 301 receives sensor data and performs a first processing on the sensor data, and the computing unit 302 receives the data processed by the computing unit 301, and performs a second processing different from the first processing on the data processed by the computing unit 301.

In an embodiment, the at least one data distribution device comprises at least two data distribution devices. A data distribution device is connected with the computing unit 301 and the computing unit 302 and sends all the sensor data received from the sensor system to another data distribution device in the sequence of reception.

Figure 4:
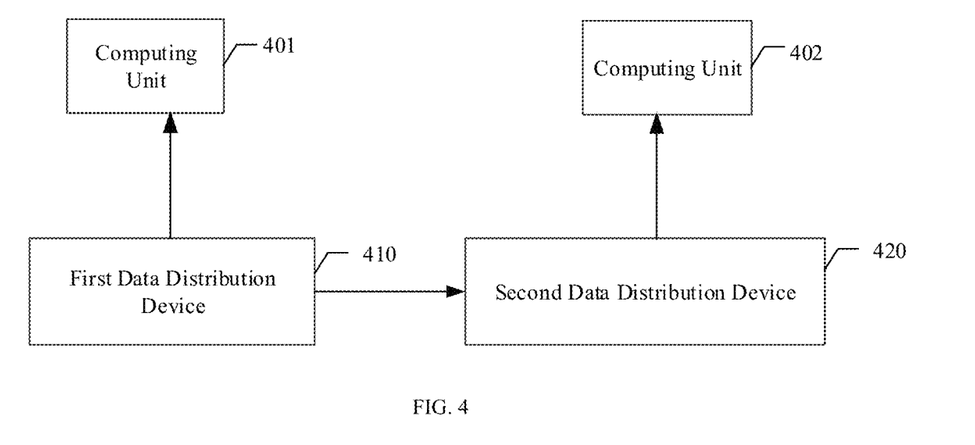
FIG. 4 is a schematic diagram of a computing system according to another embodiment of the present disclosure.

FIG. 4 is a schematic diagram of a computing system according to another embodiment of the present disclosure. As shown in FIG. 4, there are at least two data distribution devices, which can be connected in series. The number of data distribution devices can be flexibly increased or decreased. A first data distribution device 410 can be connected with one or more computing units (e.g., a computing unit 401), and a second data distribution device 420 can be connected with one or more other computing units (e.g., a computing unit 402). The first data distribution device 410 and the second data distribution device 420 can be the data distribution device 100 of FIG. 1 or the data distribution device 200 of FIG. 2. The first data distribution device 410 can send sensor data to the second data distribution device 420 in one aspect, and can send the sensor data meeting a first predetermined condition to the computing unit 401 connected therewith in another aspect; the second data distribution device 420 can continue to send the sensor data to another data distribution device connected therewith in one aspect, and can send the sensor data meeting a second predetermined condition to the computing unit 402 connected therewith in another aspect. On the basis, sensor data can be distributed to different computing units by at least two data distribution devices connected in series, thereby improving processing efficiency and flexibility of the sensor data.

The sensor data processed by the computing unit 401 and the computing unit 402 can be from different sensors of the same type, or from sensors of different types, and different sensors can be distinguished by identifiers, as described above.

In other embodiments, the computing unit 401 and the computing unit 402 can perform different processing on sensor data. For example, the computing unit 401 receives sensor data and performs a first processing on the sensor data, and the computing unit 402 receives the data processed by the computing unit 401, and performs a second processing different from the first processing on the data processed by the computing unit 401.

Figure 5:
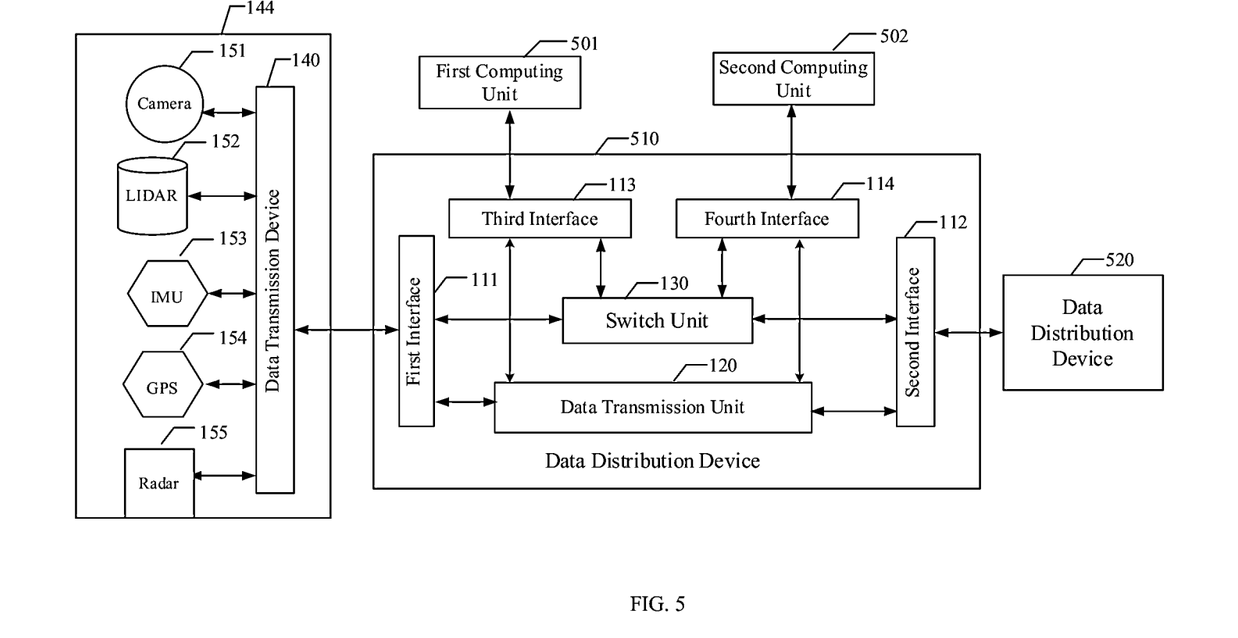
FIG. 5 is a schematic diagram of a computing system connected with a sensor system according to an embodiment of the present disclosure.

FIG. 5 is a schematic diagram of a computing system connected with a sensor system according to an embodiment of the present disclosure. As shown in FIG. 5, the computing system comprises a data distribution device 510, a data distribution device 520, a computing unit 501, and a computing unit 502. Although the data distribution device 510 is connected with two computing units (i.e., the computing unit 501 and the computing unit 502) as shown in FIG. 5, the data distribution device 510 can be connected with more or fewer computing units. The data distribution device 520 can have the same or similar structure as the data distribution device 510 and can be connected with one or more computing units (not shown in the figure). The data distribution device 510 can be the data distribution device 200 of FIG. 2 or data distribution device 100 of FIG. 1. The data distribution device 520 can be the data distribution device 100 of FIG. 1 or the data distribution device 200 of FIG. 2. For the purpose of simplicity of description, the same or similar parts of the data distribution device 510 as the data distribution device 100 and the data distribution device 200 are not repeated.

The sensor system 144 may comprise an inertial measurement unit (IMU), a global navigation satellite system (GNSS) transceiver (e.g., a global positioning system (GPS) transceiver), a radio detection and ranging device (RADAR), a laser detection and ranging system (LIDAR), an acoustic sensor, an ultrasonic sensor, an image acquisition device (e.g., a camera), and the like. In the example of FIG. 5, the sensor system 144 comprises, for example, camera(s) 151, LIDAR(s) 152, IMU(s) 153, GPS transceiver(s) 154, and radar(s) 155. Sensor data of different sensors can be distributed to different computing units for processing. The sensor data comprise a plurality of data packets, the sensor data in each data packet is generated by the same sensor, and each data packet carries a sensor identifier of the sensor generating the data packet which provides a basis for the distribution of the data packet to a matched computing unit. The data distribution device can send each data packet to the matched computing unit for processing according to the sensor identifier carried by the data packet.

As shown in FIG. 5, first data (e.g., sensor data) are provided from the sensor system to the data distribution device 510 through a first interface 111 and to the data distribution device 520 through a second interface 112 of the data distribution device 510. The data distribution device 510 can provide all the sensor data received from the sensor system through the first interface 111 to the data distribution device 520 in the sequence of reception. In the data distribution device 510, some of the sensor data can flow from the data transmission unit 120 to the interfaces connected with the computing units (e.g., the third interface 113 and the fourth interface 114) and thus are distributed to the computing units corresponding thereto. The second data can be flexibly switched among the third interface 113, the fourth interface 114, the first interface 111 and the second interface 112 through the switch unit 130. On this basis, the computing system can realize the transmission and interchanging of various data.

The data distribution device 520 can have the same or similar structure as the data distribution device 510. Although FIG. 5 shows only two data distribution devices, the computing system may comprise more data distribution devices connected in series. A first data channel and a second data channel can be formed in the plurality of data distribution devices. The first data channel (e.g., including a data transmission unit) is configured for transmitting all the first data (e.g., sensor data) between the data distribution devices in sequence, and the second data channel comprises a switch and is configured for switching the second data between the computing units.

In an embodiment, the sensor system 144 may comprise a data transmission device 140 configured for providing data from each sensor of the sensor system to the first interface 111. The data transmission device 140 may comprise a plurality of input interfaces independently connected with different sensors and an output interface connected with the first interface 111. With the data transmission device 140, the data distribution device can receive sensor data of a plurality of sensors through only one interface.

The sensor data can be transferred between data distribution devices. The sensor data can be sent to a computing unit by a data distribution device connected with the computing unit under the condition that the sensor data matches the computing unit, so that the system has better scalability. A plurality of computing units can complete the processing of sensor data of a plurality of sensors together.

Figure 6:
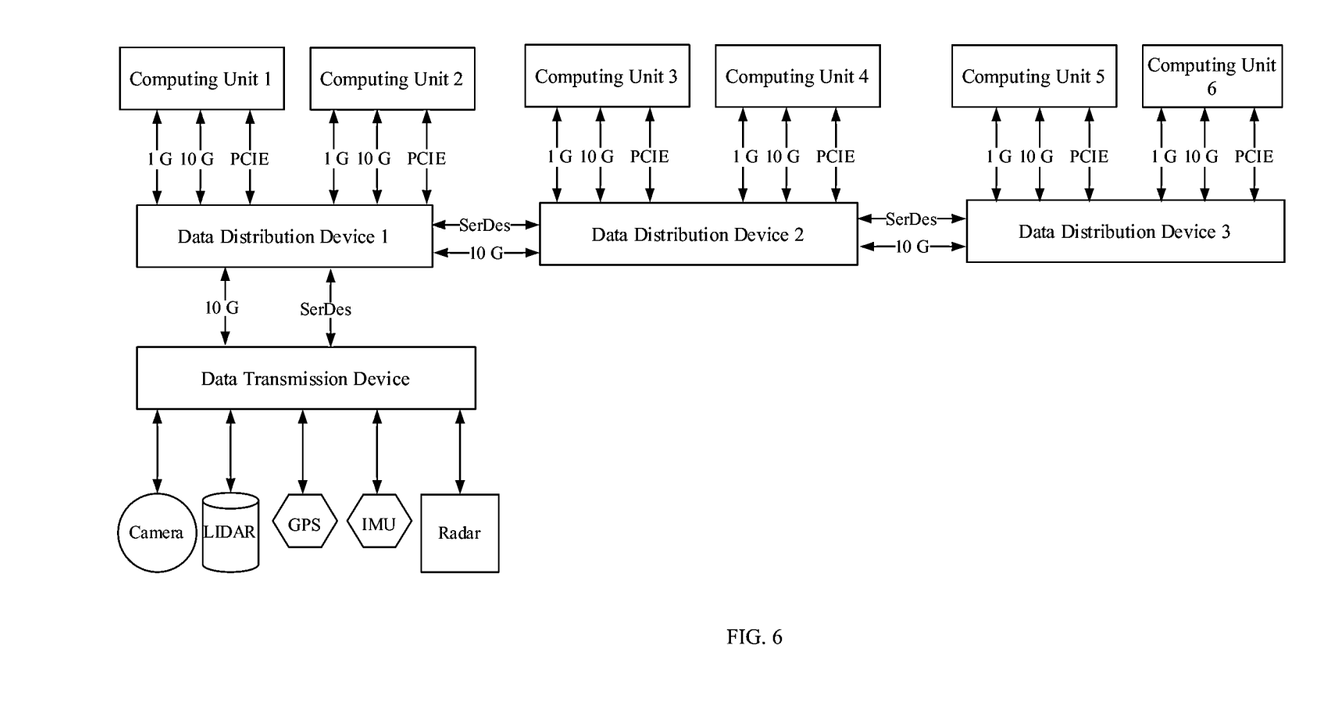
FIG. 6 is a schematic diagram of a computing system connected with a sensor system according to yet another embodiment of the present disclosure.

FIG. 6 is a schematic diagram of a computing system according to yet another embodiment of the present disclosure. As shown in FIG. 6, the computing system is connected to a sensor system, which includes a data transmission device and multiple sensors such as a camera, a LIDAR, an IMU, a GPS transceiver, and a radar. The computing system shown in FIG. 6 comprises three data distribution devices (each of which can be the data distribution device 100 of FIG. 1, the data distribution device 200 of FIG. 2, or the data distribution device 510 of FIG. 5), each of which is connected with two computing units, can acquire all sensor data and can distribute sensor data meeting the respective predetermined condition to the respective computing unit. For example, a data distribution device 1 can distribute sensor data of one or more cameras to a computing unit 1 and a computing unit 2 for processing, and send all received sensor data to a data distribution device 2 in the sequence of reception. The data distribution device 2 can distribute sensor data of one or more LIDARs to a computing unit 3 and a computing unit 4 for processing, and send all the sensor data to a data distribution device 3 in the sequence of reception. The data distribution device 3 can distribute sensor data of one or more radars to a computing unit 5 and a computing unit 6 for processing. It should be noted that, although each of the three data distribution devices is connected with two computing units as shown in FIG. 6, those skilled in the art will appreciate that there can be more or fewer data distribution devices, and each data distribution device can be connected with more or fewer computing units.

The computing system of this embodiment has better scalability, and the number of the computing units and the number of the data distribution devices can be flexibly increased or decreased. Each data distribution device can be connected with one or more computing units, and in some cases, up to 32 computing units. Multiple computing units can be formed by aggregation of either homogeneous computing platforms or heterogeneous computing platforms. On this basis, the high-efficient data processing of a large number of sensor data from sensors of the same type or different types can be realized.

The data distribution device can be connected to the computing units through at least one of a PCIE interface and an Ethernet interface. There may be one or more Ethernet interfaces, for example, Ethernet interfaces with different bandwidths (for example, an Ethernet interface with a bandwidth of 1 G and an Ethernet interface with a bandwidth of 10 G). The PCIE interface and the 10 G Ethernet interface can provide high-bandwidth communication, and the 1 G Ethernet interface can provide low-bandwidth communication, so that some computing units with simpler performance are compatible in the computing system. The data distribution device can send sensor data to matched computing units through different interfaces according to actual requirements. The connections between data distribution devices and between a data distribution device and a sensor system can be implemented through a SerDes or through an Ethernet interface so as to meet different actual requirements.

Figure 7:
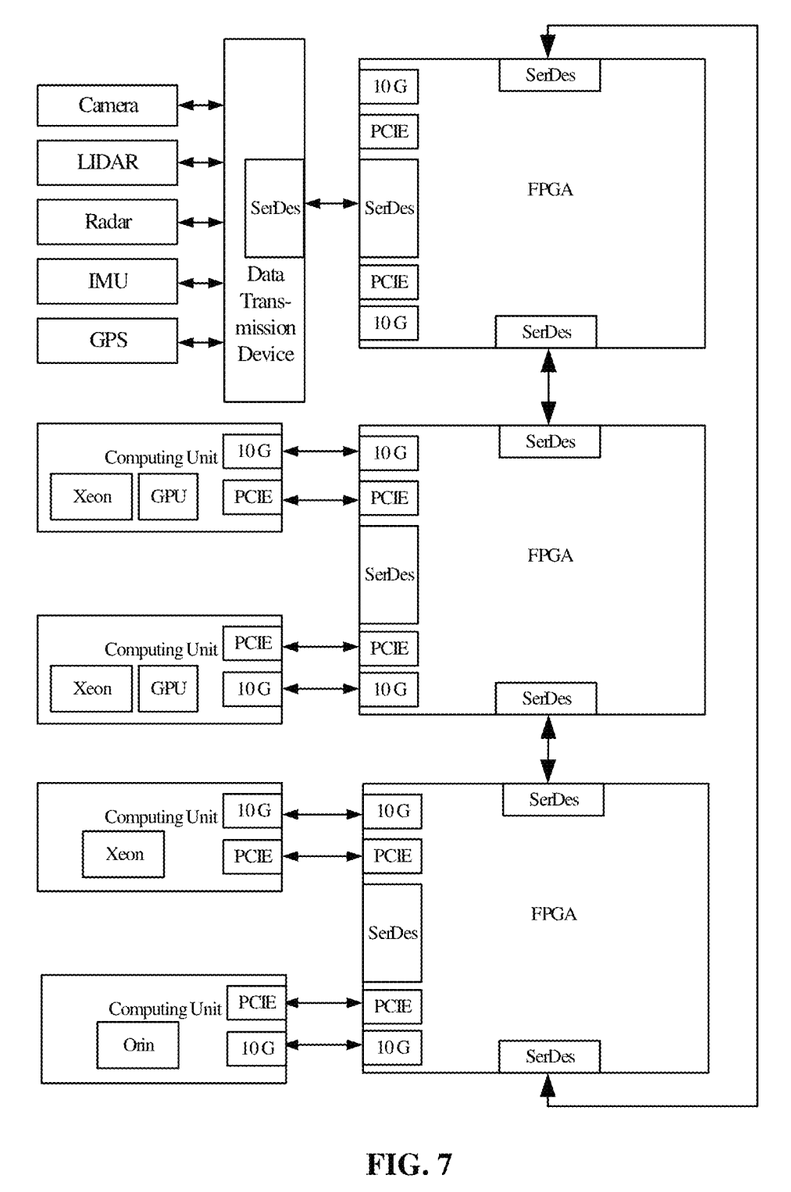
FIG. 7 is a schematic diagram of a computing system connected with a sensor system according to another embodiment of the present disclosure.

FIG. 7 is a schematic diagram of a computing system connected with a sensor system, according to another embodiment of the present disclosure. As shown in FIG. 7, the sensor system comprises various sensors, such as a camera, a LIDAR, a radar, a GPS transceiver, and/or an IMU. The sensor system may further comprise other sensors connected through a controller area network (CAN), or others. The data distribution devices can be implemented using FPGAs (and each can be the data distribution device 100 of FIG. 1, the data distribution device 200 of FIG. 2, or the data distribution device 510 of FIG. 5), and each implements a data switching function based on an Ethernet (e.g., a 10 G network) standard and the PCIE standard by using logic in the FPGA, thereby providing a high-speed communication channel for the computing unit. FPGAs are connected with different computing units to form a heterogeneous distributed computing system, so that data distribution function is provided, flexible adaptation can be realized, and a more flexible hardware platform is provided for systems such as an autonomous driving system and a large-sized robot system, thereby improving the computing performance and the communication reliability of the system. In addition, the data distribution devices are connected with each other to form a ring structure as also shown in FIG. 7, and the data distribution devices can have the same structure and function; each data distribution device can be connected with the sensor system, and each data distribution device can be connected with the computing unit, so that the flexibility of the arrangement of the computing system can be improved.

In the embodiment of the present disclosure, a data distribution method is also provided. The data distribution can be performed by any one of the data distribution devices described above.

Figure 8:
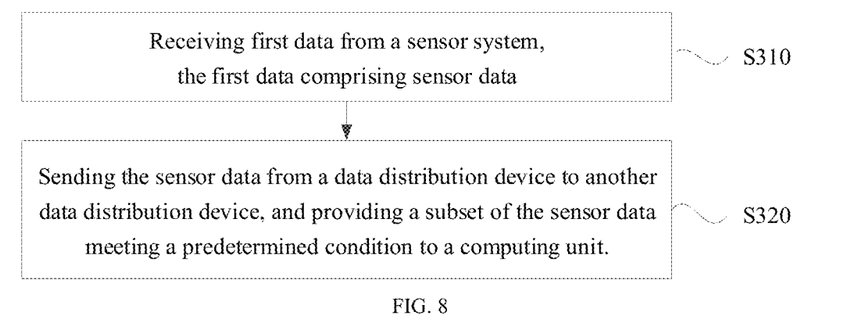
FIG. 8 is a flow chart of a data distribution method according to an embodiment of the present disclosure.

FIG. 8 is a flow chart of a data distribution method according to an embodiment of the present disclosure. The method can be implemented by any one of the data distribution devices described above with reference to FIGS. 1-7. As shown in FIG. 8, the data distribution method comprises steps S310 and S320.

At step S310, first data is received from a sensor system, and the first data includes sensor data.

The sensor system comprises at least one sensor, and the first data comprise sensor data received by the data distribution device from the sensor system. The first data may comprise data collected by one or more sensors.

At step S320, the sensor data is sent to another data distribution device, and a subset of the sensor data meeting a predetermined condition is provided to a computing unit.

According to the method of this embodiment, in one aspect, sensor data can be sent from one data distribution device to another data distribution device so as to realize the transmission of the sensor data; in another aspect, a subset of the sensor data meeting a predetermined condition can be provided to a computing unit so as to realize the distribution of the sensor data, wherein the predetermined condition is mainly configured for describing a matching relationship between the sensor data and the computing unit. On this basis, the load of the computing unit is effectively controlled, and the data processing efficiency of the sensor is improved.

In an embodiment, the process of sending the sensor data from one data distribution device to another data distribution device comprises: sending all the sensor data from the one data distribution device to the other data distribution device in the sequence of reception.

In this embodiment, the entire sensor data can be transmitted between different data distribution devices in the sequence of reception, and on this basis, each data distribution device can acquire all and entire sensor data.

In an embodiment, the process of providing a subset of the sensor data meeting a predetermined condition to a computing unit comprises: for each data packet of the sensor data: determining whether a sensor identifier carried by the data packet matches a predetermined identifier or not, and providing the data packet to the computing unit in response to the sensor identifier matching the predetermined identifier.

In this embodiment, sensor data of different sensors can be distributed to the matched computing units for processing according to the predetermined condition. The sensor data comprise a plurality of data packets, the sensor data in each data packet are generated by the same sensor, and each data packet carries a sensor identifier of the sensor which provides a basis for the distribution of the data packet to a matched computing unit. The data distribution device can send each data packet to the matched computing unit for processing according to the sensor identifier carried by the data packet.

In an embodiment, the data distribution method further comprises: providing second data received from the computing unit to another computing unit.

The method of this embodiment also supports the switching of the second data between different computing units. The second data mainly refer to any data provided by the computing unit, for example, processed data suffering processing of the computing unit, or instructions generated by the computing unit. The second data can flow from one computing unit to a data distribution device with which the computing unit is connected, and flow from the data distribution device to another computing unit with which the data distribution device is connected or to another data distribution device and then flow from the another data distribution device to a computing unit with which the another data distribution device is connected.

The method of this embodiment not only realizes the transmission and distribution of the first data, but also realizes the switching of the second data, thereby improving the efficiency and flexibility of sensor data processing.

Figure 9:
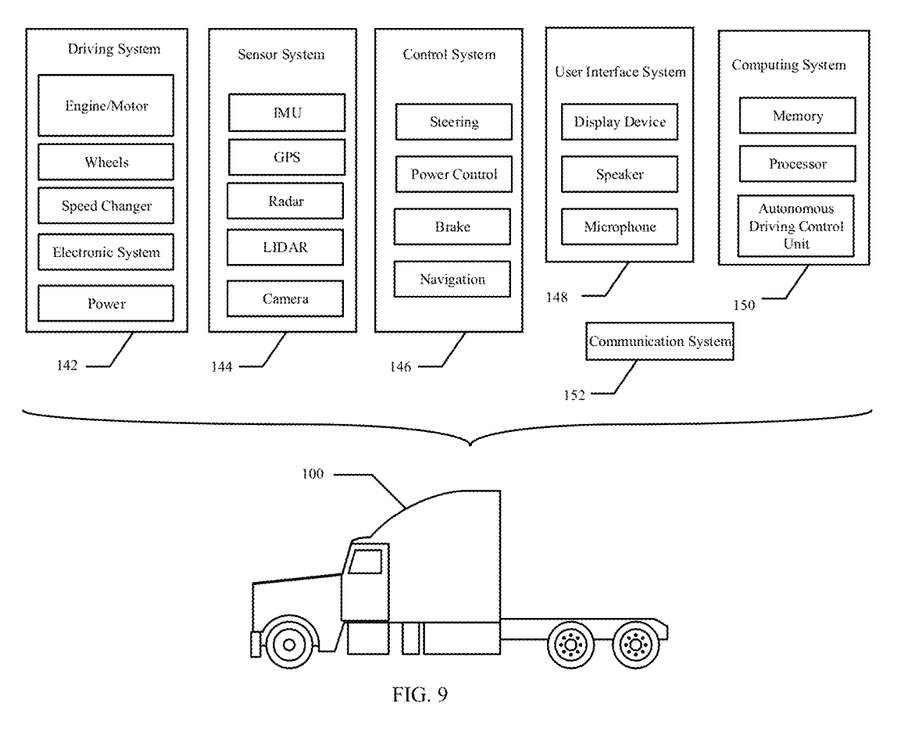
FIG. 9 is a schematic diagram of a vehicle in which various techniques disclosed herein are implemented.

FIG. 9 is a schematic diagram of a vehicle in which various techniques disclosed herein are implemented. A vehicle 100 can be a car, a truck, a motorcycle, a bus, or other vehicles. The vehicle 100 can be operated fully or partially in an autonomous driving mode. The vehicle 100 can control itself in the autonomous driving mode. For example, the vehicle 100 can determine a current state of the vehicle and a current state of an environment in which the vehicle is located, determine a predicted behavior of at least one other vehicle in this environment, and determine a trust level corresponding to a likelihood that the at least one other vehicle performs the predicted behavior, and thus the vehicle 100 can control itself based on these determined information. The vehicle 100, when in the autonomous driving mode, can be operated without human interaction.

The vehicle 100 may comprise various vehicle systems, such as a driving system 142, a sensor system 144, a control system 146, a user interface system 148, a computing system 150, and a communication system 152. The vehicle 100 may comprise more or fewer systems, each of which may comprise a plurality of units. Further, each system and unit of the vehicle 100 can be interconnected.

The driving system 142 may comprise a plurality of operable components (or units) that provide kinetic energy for the vehicle 100. In an embodiment, the driving system 142 may comprise an engine or a motor, wheels, a speed changer, an electronic system, and power (or a power source).

The sensor system 144 can be any one of the sensor systems described above with reference to FIGS. 5-7, and may comprise a plurality of sensors configured for sensing information about the environment and conditions of the vehicle 100. For example, the sensor system 144 may comprise an inertial measurement unit (IMU), a global navigation satellite system (GNSS) transceiver (e.g., a global positioning system (GPS) transceiver), a radio detection and ranging device (RADAR, or radar), a laser detection and ranging system (LIDAR, or laser radar), an acoustic sensor, an ultrasonic sensor, and an image acquisition device (e.g., a camera). The sensor system 144 may comprise a plurality of sensors (e.g., oxygen ($O_2$) monitors, fuel gauge sensors, engine oil pressure sensors, temperature sensors, humidity sensors, and pressure sensors) configured for monitoring the vehicle 100. Other sensors may also be configured. One or more sensors comprised in the sensor system 144 can be driven independently or collectively to update the position, orientation, or both of the one or more sensors.

The control system 146 is configured for controlling the operation of the vehicle 100 and components (or units) thereof. Accordingly, the control system 146 may comprise various units, such as a steering unit, a power control unit, a brake unit, and a navigation unit.

The user interface system 148 can be configured for allowing the interaction between the vehicle 100 and external sensors, other vehicles, other computer systems, and/or users of the vehicle 100. For example, the user interface system 148 may comprise a standard visual display device (e.g., a plasma display, a liquid crystal display (LCD), a touch screen display, a head-mounted display, or other similar display), a speaker or other audio output devices, a microphone, or other audio input devices.

The communication system 152 can provide the vehicle 100 with a way to communicate with one or more devices or other vehicles in the vicinity.

The computing system 150 can control some or all of the functions of the vehicle 100. An autonomous driving control unit of the computing system 150 can be configured for identifying, evaluating, and avoiding or eliminating potential obstacles in the environment in which the vehicle 100 is located. In general, the autonomous driving control unit can be configured for controlling the vehicle 100 in the absence of a driver or for providing assistance to the driver in controlling the vehicle. In some embodiments, the autonomous driving control unit is configured for combining data from sensors, for example, combining data from a GPS transceiver, data from a radar, data from a LIDAR, data from a camera, and data from other vehicle systems, to determine a path or trajectory of travel for the vehicle 100. The autonomous driving control unit can be activated to enable the vehicle 100 to be driven in an autonomous driving mode.

The computing system 150 may comprise at least one processor (which may comprise at least one microprocessor) that executes processing instructions (i.e., machine-executable instructions) stored in a non-volatile computer readable medium (e.g., a data storage device or a memory).

In some embodiments, the memory may contain processing instructions that are executed by the processor to implement various functions of the vehicle 100 (e.g., program logic). In an embodiment, the computing system 150 can perform data communication with the driving system 142, the sensor system 144, the control system 146, the user interface system 148, and/or the communication system 152. The interfaces of the computing system are configured for facilitating data communication between the computing system 150 and the driving system 142, the sensor system 144, the control system 146, the user interface system 148, and the communication system 152.

Although the autonomous driving control unit is shown as separated from the processor and the memory, it should be understood that, in some embodiments, some or all of the functions of the autonomous driving control unit can be implemented using program code instructions residing in one or more processors (or data storage devices) and can be executed by the one or more processors, and that the autonomous driving control unit can be implemented using the same processor and/or memory (or data storage devices) in some cases.

The computing system 150 can also be any one of the computing systems described above with reference to FIGS. 1-7, and may comprise a plurality of computing units that distributively control components or systems of the vehicle 100. Although the computing system 150 is described above as receiving inputs from the sensor system, those skilled in the art will appreciate that the computing system 150 can control the functions of the vehicle 100 based on inputs received from various other vehicle systems (e.g., the driving system 142, the control system 146, and the user interface system 148). For example, the computing system 150 can use inputs from the control system 146 to control the steering unit to avoid obstacles detected by the sensor system 144. In an embodiment, the computing system 150 can be configured for controlling various aspects of the vehicle 100 and systems thereof.

In an embodiment of the present disclosure, a computer readable storage medium having a program instruction stored thereon is also provided, wherein the program instruction, when executed by a processor, implements the data distribution method according to any one of the above embodiments of the present disclosure.

It is to be noted that the above description is only preferred embodiments of the present disclosure and the principles of the employed technologies. Those skilled in the art will appreciate that the present disclosure is not limited to the particular embodiments described herein, and those skilled in the art can make various obvious changes, rearrangements and substitutions without departing from the protection scope of the present disclosure. Therefore, although the present disclosure has been described in some detail by the above embodiments, it is not limited to the above embodiments, and may further include other equivalent embodiments without departing from the spirit of the present disclosure, and the scope of the present disclosure is determined by the scope of the appended claims.

What is claimed is:

1. A data distribution device, comprising:
a plurality of interfaces comprising at least a first interface, a second interface and a third interface, wherein the first interface is configured for receiving, from a plurality of sensors, first data comprising sensor data, the second interface is configured for outputting the first data, and the third interface is configured for communicating with a first computing unit, wherein the sensor data comprises a plurality of data packets, each data packet carrying a sensor identifier associated with one of the plurality of sensors; and
a data transmission unit configured for:
providing the sensor data from the first interface to the second interface;
selecting a subset of the sensor data received by the first interface according to sensor identifiers, by determining, for each data packet, whether the sensor identifier carried by a data packet matches a predetermined identifier or not; and,
providing the selected subset of the sensor data to the third interface.

2. The data distribution device according to claim 1, further comprising:
a switch unit configured for switching second data between the third interface and at least one of the first interface and the second interface.

3. The data distribution device according to claim 1, further comprising:
a fourth interface configured for communicating with a second computing unit, and
a switch unit configured for switching second data at least between the third interface and the fourth interface.

4. The data distribution device according to claim 1, wherein
the third interface is configured to operate in accordance with a peripheral component interconnection express (PCIE) standard, and the data distribution device is corresponds to an endpoint (EP) in the PCIE standard.

5. The data distribution device according to claim 1, further comprising:
a fifth interface operating in accordance with an Ethernet standard and configured for communicating with a third computing unit, and
a switch unit configured for switching second data between the fifth interface and at least one of the first interface and the second interface.

6. The data distribution device according to claim 1, wherein the first interface and the second interface each comprise a SERializer/DESerializer (SerDes).

7. The data distribution device according to claim 1, wherein the data distribution device is implemented by a field programmable gate array (FPGA).

8. The data distribution device according to claim 1, wherein the data transmission unit is further configured for:
receiving an instruction from the first computing unit through the third interface, the instruction carrying the predetermined identifier.

9. The data distribution device according to claim 1, further comprising:
a fourth interface configured for communicating with a second computing unit, wherein
the third interface and the fourth interface are configured to operate in accordance with a peripheral component interconnection express (PCIE) standard, the data distribution device corresponds to an endpoint (EP) in the PCIE standard, and the first computing unit and the second computing unit correspond to roots in the PCIE standard.

10. The data distribution device according to claim 1, further comprising:
a preprocessing unit between the data transmission unit and the third interface and configured for preprocessing the subset of the sensor data.

11. A computing system, comprising:
a plurality of computing units comprising at least a first computing unit and a second computing unit; and
at least one data distribution device configured for:
receiving first data from a sensor system comprising a plurality of sensors, the first data comprising sensor data, wherein the sensor data comprises a plurality of data packets, each data packet carrying a sensor identifier associated with one of the plurality of sensors;
selecting a first subset of the sensor data according to sensor identifiers, by determining, for each data packet, whether the sensor identifier carried by a data packet matches a first predetermined identifier or not;
providing the selected first subset of the sensor data to the first computing unit;
selecting a second subset of the sensor data according to the sensor identifiers, by determining, for each data packet, whether the sensor identifier carried by the data packet matches a second predetermined identifier or not; and
providing the selected second subset of the sensor data to the second computing unit.

12. The computing system according to claim 11, wherein the at least one data distribution device comprises at least a first data distribution device and a second data distribution device, wherein
the first data distribution device is configured for:
receiving the sensor data from the sensor system; and
sending all the sensor data received from the sensor system to the second data distribution device in a sequence of reception of the sensor data.

13. The computing system according to claim 11, wherein the at least one data distribution device comprises at least a first data distribution device and a second data distribution device, wherein the first data distribution device is configured, for each data packet, for providing the data packet to the second data distribution device.

14. The computing system according to claim 11, wherein the at least one data distribution device comprises a plurality of data distribution devices connected in series, and the plurality of data distribution devices comprise at least a first data channel and a second data channel, wherein
the first data channel is configured for transmitting all the sensor data between data distribution devices;
the second data channel comprises a switch and is configured for switching second data between the plurality of computing units.

15. The computing system according to claim 11, wherein the at least one data distribution device is configured to operate as an endpoint in PCIE standard, and the first computing unit and the second computing unit are configured to operate as roots in the PCIE standard.

16. A data distribution method, comprising:
   receiving, by a data distribution device, first data from a sensor system comprising a plurality of sensors, the first data comprising sensor data, wherein the sensor data comprises a plurality of data packets, each data packet carrying a sensor identifier associated with one of the plurality of sensors;
   sending, by the data distribution device, the sensor data to another data distribution device;
   selecting, by the data distribution device, a subset of the sensor data according to sensor identifiers, by determining, for each data packet, whether the sensor identifier carried by a data packet matches a predetermined identifier or not; and
   providing, by the data distribution device, the selected subset of the sensor data to a computing unit.

17. The data distribution method according to claim 16, wherein sending the sensor data from the data distribution device to the another data distribution device comprises:
   sending all of the sensor data from the data distribution device to the another data distribution device in a sequence of reception of the sensor data from the sensor system.

18. The data distribution method according to claim 16, further comprising:
   providing second data received from the computing unit to another computing unit.

19. The data distribution method according to claim 16, wherein the data distribution device is configured to operate as an endpoint in PCIE standard, and the computing unit is configured to operate as a root in the PCIE standard.

20. The data distribution method according to claim 16, further comprising:
   receiving an instruction from the computing unit carrying the predetermined identifier.

* * * * *